(12) United States Patent
Ono et al.

(10) Patent No.: US 8,506,102 B2
(45) Date of Patent: Aug. 13, 2013

(54) INDICATOR AND DISPLAY APPARATUS

(75) Inventors: Haruyoshi Ono, Shimada (JP); Atsushi Yoshimura, Shimada (JP)

(73) Assignee: Yazaki Corporation, Tokyo (JP)

( * ) Notice: Subject to any disclaimer, the term of this patent is extended or adjusted under 35 U.S.C. 154(b) by 199 days.

(21) Appl. No.: 13/064,471

(22) Filed: Mar. 28, 2011

(65) Prior Publication Data

US 2011/0242790 A1    Oct. 6, 2011

(30) Foreign Application Priority Data

Apr. 2, 2010    (JP) ................................. 2010-085787

(51) Int. Cl.
*F01P 11/16*    (2006.01)

(52) U.S. Cl.
USPC ..................................... 362/23.09; 362/23.07

(58) Field of Classification Search
USPC ........................................ 362/26; 340/815.78
See application file for complete search history.

(56) References Cited

U.S. PATENT DOCUMENTS

| | | | |
|---|---|---|---|
| 4,380,043 A | 4/1983 | Takamatsu et al. | |
| 5,050,045 A | 9/1991 | Kato et al. | |
| 5,211,128 A | 5/1993 | Katoh et al. | |
| 6,955,438 B2 | 10/2005 | Ishii | |
| 7,905,612 B2 | 3/2011 | Suess et al. | |
| 8,120,506 B2 * | 2/2012 | Ono | 340/815.78 |
| 2006/0209525 A1 * | 9/2006 | Birman et al. | 362/23 |
| 2009/0154136 A1 | 6/2009 | Harada et al. | |
| 2010/0007509 A1 | 1/2010 | Ono | |
| 2011/0232563 A1 * | 9/2011 | Ono et al. | 116/284 |

FOREIGN PATENT DOCUMENTS

| | | |
|---|---|---|
| DE | 3300271 A1 | 7/1984 |
| DE | 3425029 A1 | 1/1985 |
| DE | 112006000243 T5 | 4/2008 |
| DE | 102009015382 A1 | 9/2010 |
| JP | 01019619 A | 1/1989 |
| JP | 04070514 A | 3/1992 |
| JP | 2008-020387 A | 1/2008 |
| JP | 2009-128257 A | 6/2009 |
| JP | 2010-019619 A | 1/2010 |

OTHER PUBLICATIONS

English translation of JP2010-019619, published Jan. 28, 2010.*
Official Communication for German Patent Application No. 10 2011 006 538.5 issued Jul. 4, 2011.

* cited by examiner

*Primary Examiner* — Mary Ellen Bowman
(74) *Attorney, Agent, or Firm* — Edwards Wildman Palmer LLP

(57) ABSTRACT

The present invention is to provide a lightweight indicator, which suppresses a backlash between a light guide portion and a light source, and a display apparatus including the indicator. The pointer includes a base portion disposed rearward of a display device and fixed to a rotation axle of a motor disposed rearward of the base portion, and extending radially from the rotation axle; a board fixed on a front face of the base portion; a light source mounted on a rear face of the board for radially outwardly emitting a light; and a light guide portion. The light guide portion is integrally formed with a first member radially outwardly extending and securely mounted on the base portion, an inward end thereof facing the light source, a second member upstanding forwardly from an outward end of the first member, a third member extending radially inwardly from an upper end of the second member, a fourth member upstanding forwardly from an inward end of the third member, and a pointer portion extending radially outwardly from an upper end of the fourth member.

10 Claims, 7 Drawing Sheets

INDICATOR AND DISPLAY APPARATUS

BACKGROUND OF THE INVENTION

1. Field of the Invention

The present invention relates to an indicator and a display apparatus, and especially to the display apparatus having a display device such as an LCD positioned at the center of a scale for a rotary pointer.

2. Description of the Related Art

A conventional display apparatus has a display device viewed from a front side through a scale for a rotary pointer. This arrangement provides an open view of the display device without obstruction of the pointer.

The scale usually shows important information such as a speed of a vehicle, and the display device shows unimportant information such as a current time. It is thus desirable to arrange the scale in front of the display device to increase visibility of the scale.

One indicator has a pointer with an inversed S-shape at an end portion thereof to remove interference between the display device and the pointer and to be appeared over the scale. This indicator has a LED light source surrounding an axle of the rotary pointer to achieve a uniform illumination. However, it is difficult to obtain the uniform illumination at a distal end of the pointer due to the complicated shape requiring for many reflection surfaces. The many reflection surfaces reduce luminance due to attenuation of light.

FIGS. 6-7 show a display apparatus solving the above problem (JP 2010-19619 A). The display apparatus 100 includes an LCD device 101 as a display device, a scale 102, a main board, a motor 104, and a pointer 105. The LCD device 101 displays several information such as a warning signal and a current time.

An index (e.g., number) is printed on a front surface of the scale 102 so that the pointer 105 points the index. The main board 103 is disposed rearwardly of the LCD device 101. A main body 104A of the motor 104 is mounted on a rear face of the main board 103 and a rotation axle 104B of the motor 104 is projecting forwardly from the main board 103. The pointer 105 includes a board 105A, an LED light source 105B, a light guide portion 105C, an attachment portion 105D (FIG. 7), and a balance weight portion 105E. The board 105A is attached to the rotation axle 104B and extends radially outwardly from the rotation axle 104B.

The LED light source 105B is disposed at the distal end and a front face of the board 105A to emit light forwardly. The light guide portion 105C includes optical guiding members of a first member 105C-1, a second member 105C-2, a third member 105C-3, and a pointer portion 105C-4. The first member 105C-1 is upstanding forwardly along the axial direction of the rotation axle 104B, and a lower end thereof faces the LED light source 105B. The second member 105C-2 extends radially inwardly from an upper end of the first member 105C-1 toward the rotation axle 104B. The third member 105C-3 is upstanding forwardly from an inward end of the second member 105C-2 along the axial direction of the rotation axle 104B. The pointer portion 105C-4 extends radially outwardly from an upper end of the third member 105C-3.

The attachment portion 105D has a top wall 105D-1 allowing force-insertion of the lower end of the first member 105C-1, and a pair of side walls 105D-2 extending downwardly from opposite side edges of the top wall 105D-1. The pair of the side walls 105D-2 have opposed slide grooves allowing insertion of opposite edges of the board 105A to fasten the light guide portion 105C to the board 105A. The balance weight portion 105B is oppositely disposed with respect to the LED light source 105B and attached on a rear surface of the board 105A in order to balance the weight of the board 105A, the LED light source 105B and the light guide portion 105C about the rotation axle 104B.

The display apparatus 100 has the pointer 105 with the LED light source 105B disposed on the board 105A fixed on the rotation axle 104B so that the LED light source 105B rotates together with the pointer 105. This arrangement removes non-uniformity of illumination of the rotating pointer 105. Referring to FIG. 6, the pointer 105 includes three reflection surfaces M11, M12 and M13 to guide a light L from the LED light source 105B to a front end of the light guide portion 105C. This arrangement has less reflection surfaces and improves the luminance of the light guide portion 105C.

The pointer 105 has a center of gravity in the attachment portion 105D with respect to the rotation axle 104B and it is thus difficult to provide the balance to the pointer 105. The imbalance of the pointer 105 causes backlash between the light guide portion 105C and the attachment portion 105D, and between the attachment portion 105D and the board 105A, resulting in reduction of accuracy of the pointer 105. The backlash may cause a displacement between the LED light source 105B and the light guide portion 105C, resulting in reduction of luminance of the light guide portion 105C.

The large sized attachment portion 105D may reduce the backlash between the attachment portion 105D and the board 105A. However, the large sized attachment portion 105D increases the weight of the pointer 105 and prevents lightweight. The LED light source 105B is positioned away from the rotation axle 104B, resulting in increase of the weight of the balance weight portion 105E and preventing the lightweight of the pointer 105.

This arrangement also causes increase of size of the board 105A, resulting the increase of entire weight of the pointer 105. The pointer 105 can be lightweight by decreasing size and thickness of the board 105A. However, the decrease of the size reduces rigidity of the pointer 105 and the decrease of the thickness causes thermal deformation of the pointer 105 as well as the decrease of the rigidity. JP 2009-128257 A and JP 2008-20387 A disclose other pointers having different shapes.

SUMMARY OF THE INVENTION

An object of the present invention is to provide a lightweight indicator, which suppresses a backlash between a light guide portion and a light source, and a display apparatus including the indicator.

According to a first object of the present invention, an indicator has a pointer for pointing a scale, the scale being disposed forward of a display device and having a hole at its own center for exposing the display device, the pointer includes a base portion disposed rearward of the display device and fixed to a rotation axle of a motor disposed rearward of the base portion, and extending radially from the rotation axle; a board fixed on a front face of the base portion; a light source mounted on the board for radially outwardly emitting a light; and a light guide portion integrally formed with a first member radially outwardly extending and securely mounted on the base portion, an inward end thereof facing the light source, a second member upstanding forwardly from an outward end of the first member, a third member extending radially inwardly from an upper end of the second member, a fourth member upstanding forwardly from an inward end of the third member, and a pointer portion extending radially outwardly from an upper end of the fourth member.

Preferably, the first member has a first reflection surface at the outward end thereof, the first reflection surface being inclined radially forwardly for forwardly reflecting the light guided with the first member, the second member has a second reflection surface at the upper end thereof, the second reflection surface being inclined radially rearwardly for radially inwardly reflecting the light guided with the second member, the third member has a third reflection surface at the inward end thereof, the third reflection surface being inclined radially rearwardly for forwardly reflecting the light guided with the third member, and the fourth member has a fourth reflection surface at the upper end thereof, the fourth reflection surface being inclined radially forwardly for radially outwardly reflecting the light guided with the fourth member.

Preferably, the first member has a latch projection forwardly projecting, and the base portion includes a bottom wall for mounting the first member, a pair of upstanding walls upstanding from opposite sides of the bottom wall for positioning the first member therebetween, and an arm having one end supported with the pair of the upstanding walls and another end engageable with the latch projection.

According to a second aspect of the present invention, a display apparatus includes the indicator as claimed in any one of claims 1-3; the display device, an outer edge of which is positioned between the first member and the third member; and the scale having the hole at its own center for exposing the display device, an inner edge of which is positioned between the third member and the pointer portion.

DETAILED DESCRIPTION OF THE PREFERRED EMBODIMENTS

Figure 1:
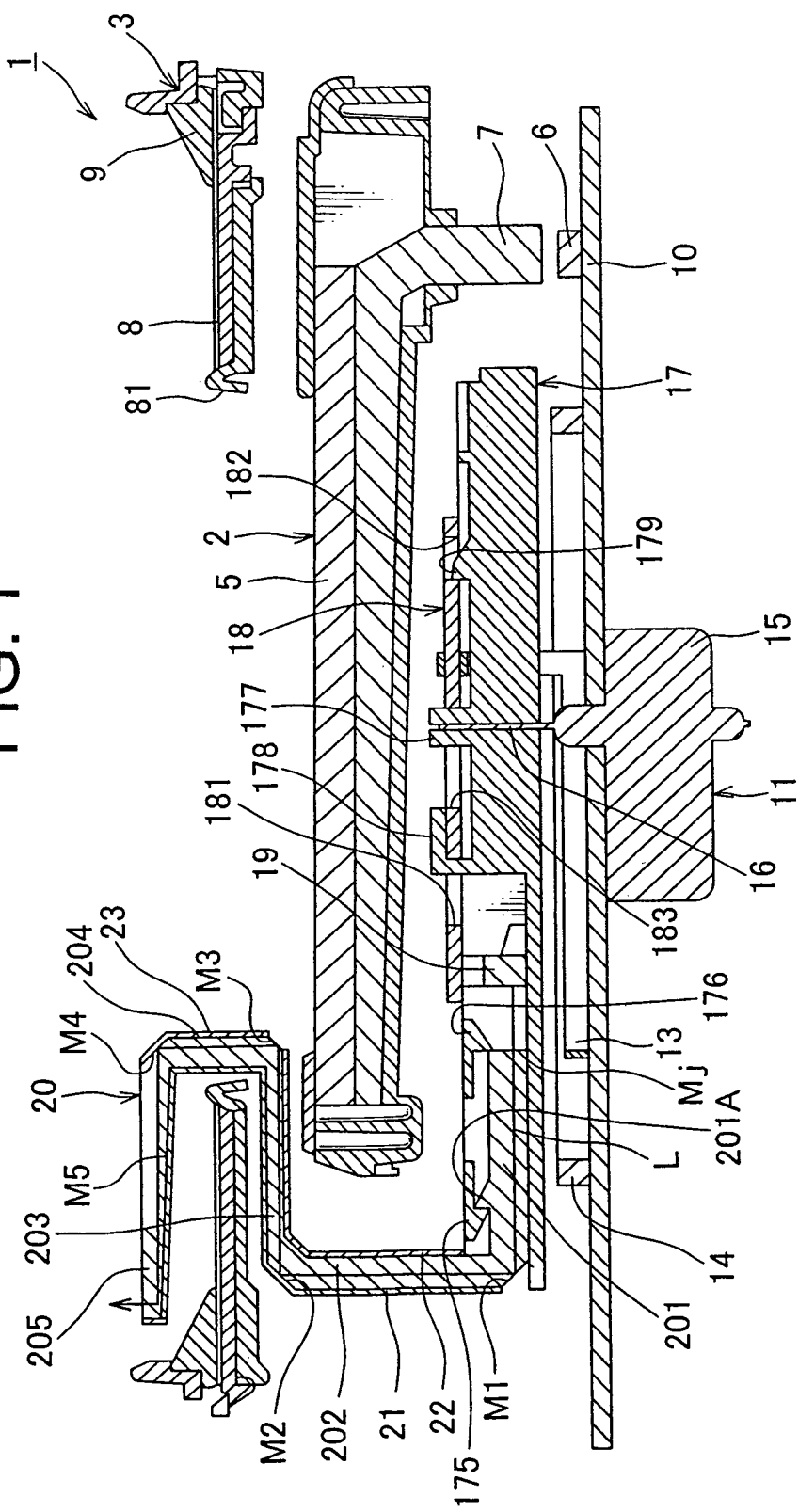
FIG. 1 is a sectional view of one embodiment of a display apparatus mounting an indicator of the present invention.

FIGS. 1-5 show an embodiment of an indicator and a display apparatus of the present invention. The display apparatus 1 includes a liquid crystal display (LCD) 2 as a display device, a scale 3, and the indicator 4. The LCD 2 has a circular shape when viewed from a front and displays information such as warning or current time. The LCD 2 includes an LCD main body 5, an LED light source 6 disposed on a main board 10, described below, as a backlight, and a light guide plate 7 guiding light from the LED light source 6 to a back face of the LCD main body 5.

The scale 3 has a dial plate 8 and a scale ring portion 9. The dial plate 8 has a ring (circular arc) shape when viewed from the front, and a circular hole 81 at its own center to expose the LCD 2. The dial plate 8 has a printed index such as numeral on a front surface. The index is pointed by a pointer 12 described below. The scale ring portion 9 is made of a light guide plate such as a transparent resin and disposed around the dial plate 8. The scale ring portion 9 has scale of recession on its own front face. The scale 3 is disposed forward of the LCD 2 and the LCD 2 is viewed from the front through the circular hole 81 formed on the dial plate 8.

The indicator 4 includes the main board 10, a motor 11, the pointer 12, a FPC (Flexible Printed Circuit) 13 as an electrical cable, and a protection member 14. The main board 10 is disposed rearward of the LCD 2. The motor 11 has a motor main body 15 and a rotation axle 16. The motor main body 15 is disposed on a rear face of the main board and the rotation axle 16 projects forwardly from the main board 10.

The pointer 12 includes an elongated base portion 17 fixed to the rotation axle 16 of the motor 11 and extending radially from the rotation axle 16, a board 18 fixed on a front face of the base portion 17, an LED light source 19 mounted on the rear face of the base portion 18 and emitting a light L radially outwardly of the rotation axle 16, a light guide portion 20, and light leak protection covers 21-23.

The light guide portion 20 includes a first member 201, a second member 202, a third member 203, a fourth member 204 and a pointer portion 205, which have a rod shape and are integrally made of a transparent resin. The first member 201 has an inward end facing the LED light source 19 and an outward end extending outwardly of an outer edge of the LCD 2. The first member 201 is attached on the base portion 17.

Figure 4:
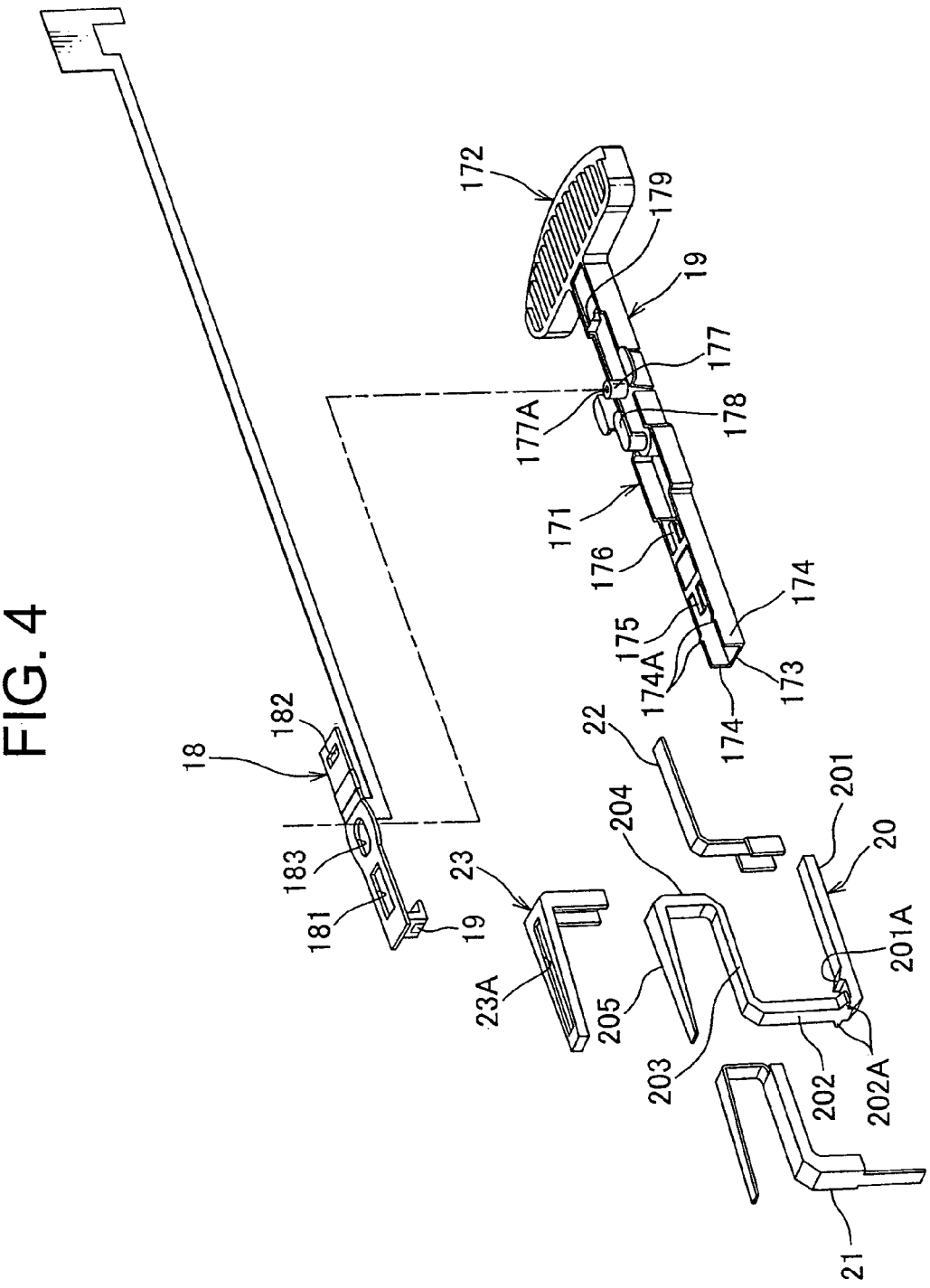
FIG. 4 is an exploded perspective view of the indicator of FIG. 3.

Referring to FIG. 4, the first member 201 has a latch projection 201 projecting forwardly and a surface inclined radially inwardly toward an upper surface thereof.

As shown in FIG. 1, the second member 202 is upstanding from the outward end of the first member 201 forward of the LCD 2 and rearward of the scale 3. The second member 202 has a pair of latch projections 202A on opposite sides thereof to be latched together with latch projections 174A as described later.

As shown in FIG. 1, the third member 203 extends radially inwardly from the upper end of the second member 202 and inward of an inward end of the scale 3. The fourth member 204 is upstanding from an inward end of the third member 203 and extends forward of the scale 3. The pointer portion 205 extends radially outwardly from an upper end of the fourth member 204 and points the scale 3.

The light guide portion 20 includes a first reflection surface M1, a second reflection surface M2, a third reflection surface M3, a fourth reflection surface M4 and a pointer reflection surface M5. The first reflection surface M1 is disposed on the outward end of the first member 201 and opposite to a light receiving face Mj. The first reflection surface M1 is radially forwardly inclined and receives the light L through the first member 201 and reflects the light L toward the second member 202.

The second reflection surface M2 is disposed on the upper end of the second member 202 and opposite to the first reflection surface M1. The second reflection surface M2 is radially rearwardly inclined and receives the light L through the second member 202 and reflects the light L toward the third member 203. The third reflection surface M3 is disposed on the inward end of the third member 203 and opposite to the second reflection surface M2. The third reflection surface M3 is radially rearwardly inclined and receives the light L through the third member 203 and reflects the light L toward the fourth member 204.

The fourth reflection surface M4 is disposed on the upper end of the fourth member 203 and opposite to the third reflection surface M3. The fourth reflection surface M4 is radially forwardly inclined and receives the light L through the fourth member 204 and reflects the light L toward the pointer portion 205. The pointer reflection surface M5 is disposed on the rear face of the pointer portion 205 and is radially forwardly inclined. The light L transmitted radially outwardly in the pointer portion 205 is emitted from the front surface by the pointer reflection surface M5.

The arrangement of the light guide portion 20 forwards radially outwardly the light L from the LED light source 19 to the light receiving face Mj, the first member 201, and the second member 202 with the first reflection surface M1. The light L in the second member 202 is forwarded to the third member 203 with the second reflection surface M2, and to the fourth member 204 with the third reflection surface M3. The light L in the fourth member 204 is forwarded to the pointer portion 205 with the fourth reflection surface M2. The light L in the pointer portion 205 is reflected with the pointer reflection surface M5 and emitted from the front surface of the pointer portion 205 so that the front surface of the pointer portion 205 is visibly illuminated.

The light guide portion 20 has the light leak-protection covers 21-23. The light leak-protection covers 21-23 cover surfaces of the light guide portion 20 except the front surface of the pointer portion 205. Referring to FIG. 4, the light leak-protection cover 21 covers a radially outward surface of the second member 202, forward lateral opposite sides of the second member 202, the second reflection surface M2, a front surface of the third member 203, lateral opposite sides of the third member 203, a radially outward surface of the fourth member 204, and the rear face of the pointer portion 205. The light leak-protection cover 22 covers rearward lateral opposite sides of the second member 202, a radially inward surface of the second member 202, and a rear face of the third member 203.

The light leak-protection cover 23 covers lateral opposite sides of the fourth member 204, a radially inward surface of the fourth member 204, the fourth reflection surface M4, lateral opposite sides of the pointer portion 205, a radially outward surface of the pointer portion 205, and the front surface of the pointer portion 205. The light leak-protection cover 23 has an opening 23A so that the front surface of the pointer portion 205 is exposed.

The light leak-protection covers 21-23 each have a white main body (not shown) made of a white material and a black portion (not shown) disposed on an outer surface of the main body. The black portion can be prepared with a black paint, or the white main body and the black portion can be mold-formed. The light leak-protection covers 21-23 prevent the light from leaking out of the surface of the light guide portion 20 except the front surface of the pointer portion 205, and improve quality of illumination.

Figure 2:
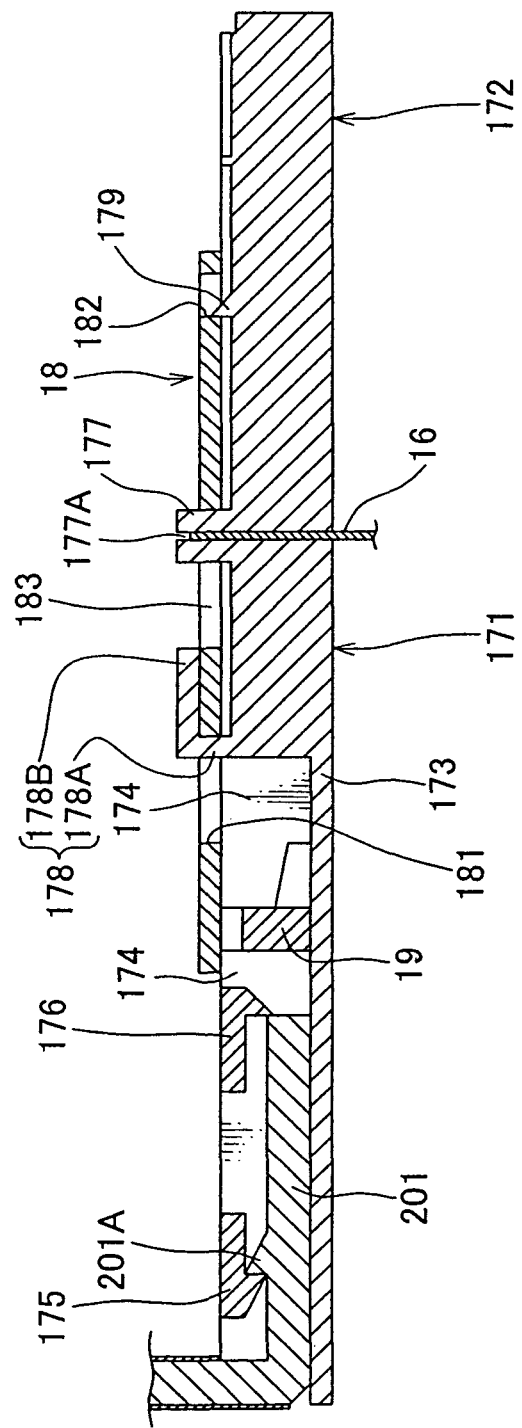
FIG. 2 is a partially enlarged view of FIG. 1.
Figure 3:
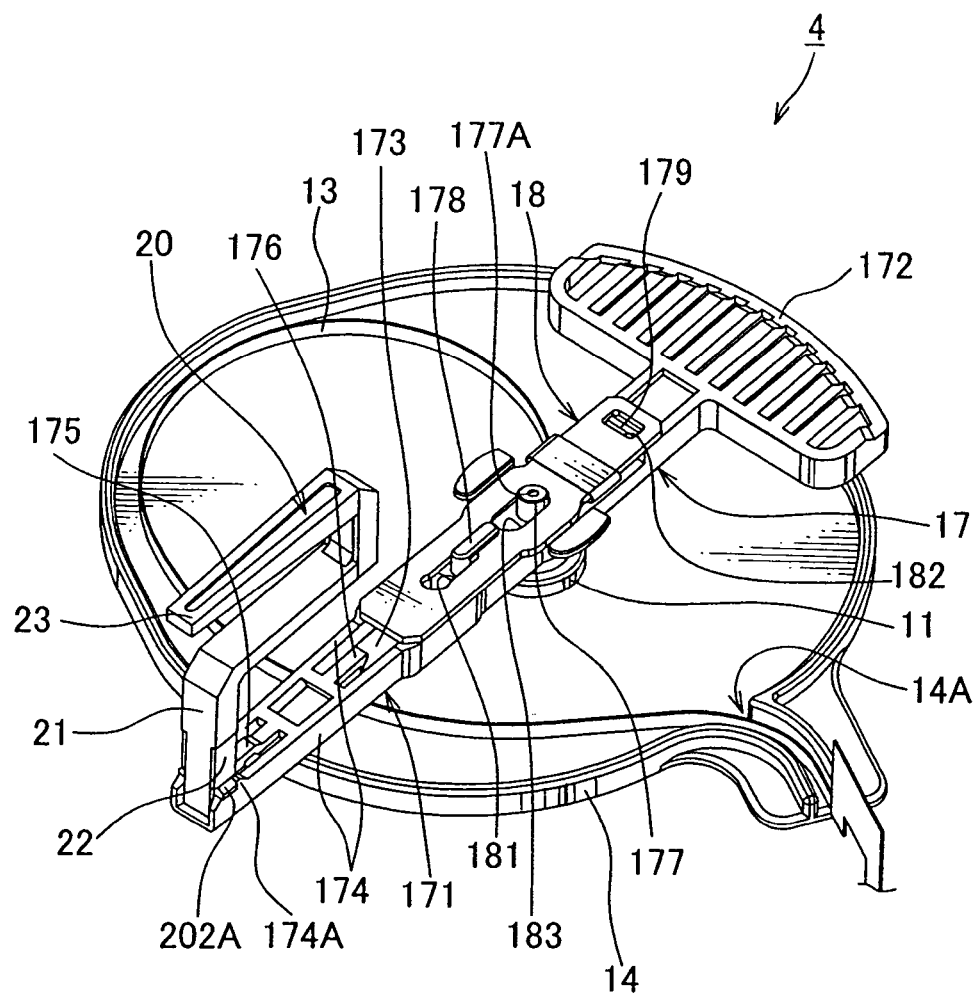
FIG. 3 is a perspective view of the indicator of FIG. 1.

As shown in FIG. 1, the base portion 17 is made of a synthetic resin and elongated along the dial plate 8. Referring to FIGS. 2-4, the base portion 17 is integral with an attachment portion 171, to which the light guide portion 20 and the board 18 are attached as described later, and a balance weight portion 172.

The attachment portion 171 has a bottom wall 173 to mount the first member 201 and a pair of upstanding walls 174 upstanding from lateral opposite sides of the bottom wall 173 to position the first member 201 therebetween. The bottom wall 173 of the base portion 17 is thick at the balance weight portion 172 and thin at its opposite side.

The attachment portion 171 has a pair of arms 175-176 in the radial direction. The outward arm 175 has a radially inward secure end held with the pair of the upstanding walls 174 and a radially outward free end flexible in the direction of the rotation axle 16. The inward arm 176 has a radially outward secure end held with the pair of the upstanding walls 174 and a radially inward free end flexible in the direction of the rotation axle 16.

Each free end of the respective arms 175-176 has a latching paw projecting rearwardly. The latching paws engage with the latch projection 201A and the light receiving face Mj of the light guide portion 20. The latching paws of the arms 175-176 have opposite rearwardly inclined surfaces in a V-shape manner. The pair of the arms 175-176 are disposed over the bottom wall 173. Referring to FIG. 3, the pair of the upstanding walls 174 have forwardly projecting latch projections 174A to lock the latch projections 202A of the light guide portion 20.

Assembly of the light guide portion 20 to the base portion 17 is explained. Firstly, the light receiving face Mj of the first member 201 is inserted into a radially outward end of the bottom wall 173 of the base portion 17 and slid therein. The first member 201 is further forwarded until the latching paw of the outward arm 175 resiliently rides over the latch projection 201A of the first member 201 and resumes an initial position. FIG. 2 shows a fully engaged position.

The light receiving face Mj is also engaged with the latching paw of the inward arm 176.

Accordingly, the first member 201 of the light guide portion 20 is fixed to the base portion 17 in the radial direction with engagements between the outward arm 175 and the latch projection 201A, between the inward arm 176 and the light receiving face Mj, and between the latch projections 174A of the upstanding walls 174 and the latch projections 202A of the second member 202. The first member 201 positioned in the pair of the arms 175-176 and the bottom wall 173 is radially fixed to the base portion 17. The pair of the upstanding walls 174 laterally fix the first member 201 to the base portion 17.

Referring to FIGS. 2-4, an axle portion 177 projects forwardly from the surface of the thick bottom wall 173. The axle portion 177 has a press-insertion hole 177A passing through the bottom wall 173. The rotation axle 16 of the motor 11 is inserted into the press-insertion hole 177A so that the base portion 17 is attached to the rotation axle 16 of the motor 11. A first 178 and a second 179 latch projection are disposed on the front surface of the thick bottom wall 173 and opposed one another about the axle portion 177.

Referring to FIG. 2, the first latch projection 178 has integrally an upstanding wall 178A upstanding from the bottom wall 173 and an upper wall 178B extending radially inwardly from an upper end of the upstanding wall 178A. The second latch projection 179 projects forwardly from the front surface of the bottom wall 173.

The balance weight portion 172 projects laterally from the opposite sides of the base portion 17 as shown in FIG. 3. The balance weight portion 172 balances the weight of the board 18, the LED light source 19 and the light guide portion 20 with respect to the rotation axle 16.

The board 18 is configured with HPC (paper phenol board, glass composite board) mounted with the LED light source 19. The board 18 is a double face board to prevent a thermal deformation or can be a cheap single face board. A heat-resistant film (not shown) such as a curing adhesive or a plating can be formed on edge surfaces (side surfaces) to prevent the thermal deformation of the board 18. The LED light source 19 is mounted on the rear face of the board 18.

Referring to FIGS. 2-4, the board 18 has a first latch hole 181 and a second latch hole 182, which are engaged with the respective latch projections 178-179, and an axle insertion hole 183 to accept the axle portion 177. The axle insertion hole 183 is disposed between the first latch hole 181 and the second latch hole 182. The first and second latch hole 181-182 and the axle insertion hole 183 are elongated in the radial direction. The first latch hole 181 has a size enough to allow entry of the upper wall 178B of the first latch projection 178.

Figure 5:
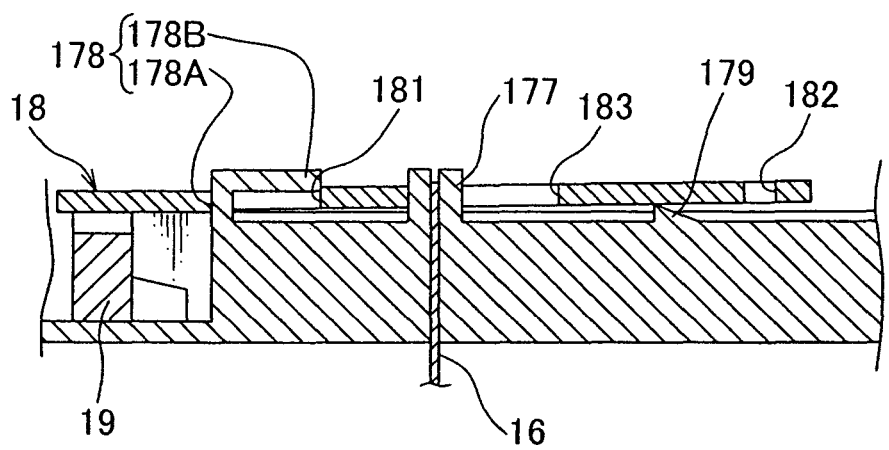
FIG. 5 shows attachment of a board to a base portion.
Figure 6:
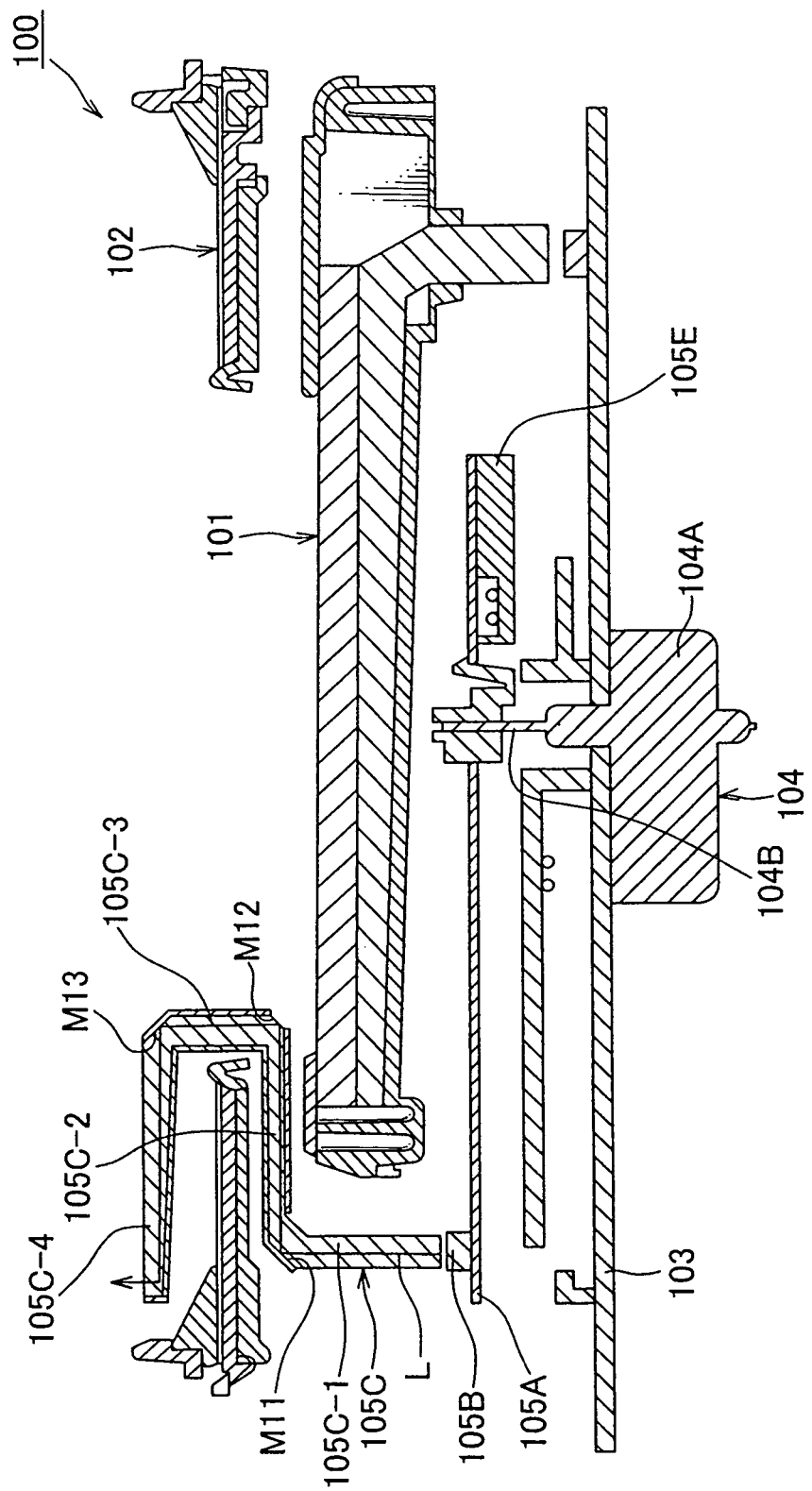
FIG. 6 is a sectional view of a conventional display apparatus.
Figure 7:
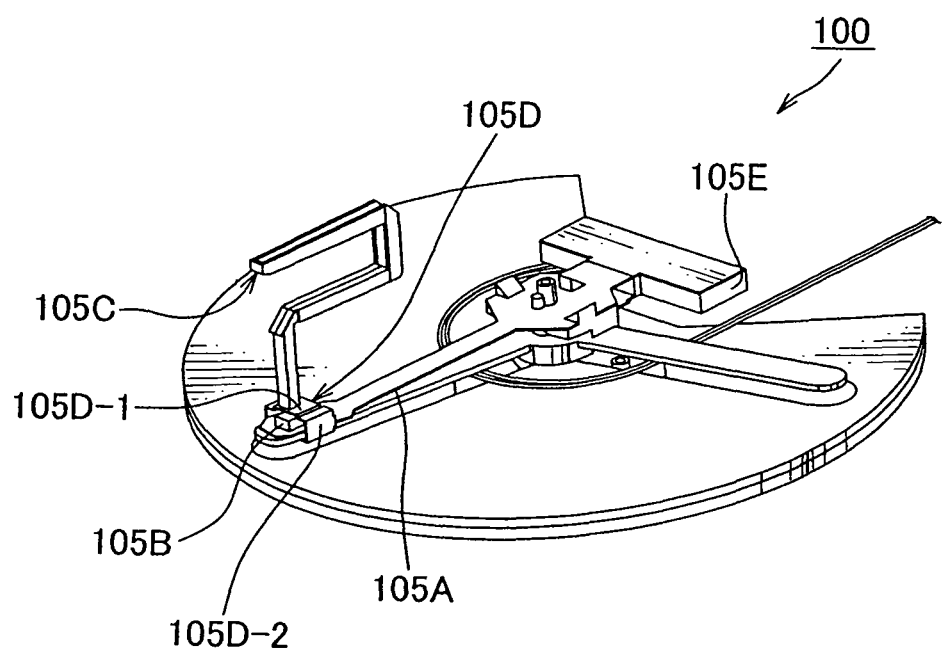
FIG. 7 is a perspective view of the conventional display apparatus.

Attachment of the board 18 to the base portion 17 is explained. Referring to FIG. 5, the board 18 is inclined against the bas portion 17, and the upper wall 178B of the first latch projection 178 is inserted into the first latch hole 181. The axle portion 177 is positioned radially outwardly of the axle insertion hole 183. The board 18 is then radially inwardly slid until a radially inward surface of the latch hole 181 abuts the upstanding wall 178A of the latch projection 178. The board 18 is then positioned rearward of the upper wall 178B as shown in FIG. 2. The second latch projection 179 is engaged with the second latch hole 182.

The board 18 is radially fixed with the upstanding wall 178B and the engagement between the latch projections 178-179 and the latch holes 181-182. The arrangement of the board 18 rearward of the upper wall 178B prevents movement of the board 18 in the axial direction. The latch projections 178-179 are inserted into the latch holes 181-182, respectively and the axle portion 177 is inserted into the axle insertion hole 183. This arrangement laterally fixes the board 18 to the base portion 17. When the board 18 is fixed to the base portion 17, the LED light source 19 is positioned on the thin portion of the bottom wall 173 and faces the light receiving face Mj of the light guide portion 20.

The FPC 13 described above is an electrical cable for power supply interconnecting the main board 10 and the board 18. Referring to FIG. 3, the lateral direction of the FPC 13 is perpendicular to the main board 10 and one end thereof is connected to the main board 10.

The protection member 14 is made of a resin and is disposed on the front surface of the main board 10 to surround the FPC 13 as shown in FIG. 3. The protection member 14 covers an area where the FPC 13 moves over the main board 10 in response to the rotation of the pointer 12. The electronic devices are not mounted on the area surrounded by the protection member 14 to avoid interference with the FPC 13. The protection member 14 has an opening 14A through which the one end of the FPC 13 is guided out and is connected to the main board 10.

According to the present invention, the first member of the light guide portion with the inversed S-shape radially outwardly extends and is securely mounted on the base portion. This arrangement has the center of gravity of the entire light guide portion on the first member, resulting in improvement of balance of the light guide portion. This arrangement reduces the backlash between the light guide portion and the light source without increasing the engagement portion between the light guide portion and the base portion, resulting in lightweight of the pointer and the display apparatus. This arrangement positions the light source in the place close to the rotation axle and achieves the lightweight of the pointer and the display apparatus, resulting in miniaturization of the board.

According to the present invention, the arrangement of the first to fourth reflection surface improves the luminance of the light guide portion.

According to the present invention, the pair of the upstanding walls of the base portion reduces the lateral backlash of the light guide portion with respect to the base portion. The assembly of the first member to the base portion is achieved by placing and sliding on the bottom wall of the base portion from the radially outward end portion of the base portion. Thereby, the latch projection of the first member and the arm of the base portion are engaged together, and the assembly of the light guide portion to the base portion is easily performed.

According to the present invention, the first member 201 of the light guide portion 20 having the inversed S-shape is fixed to the base portion 17. This arrangement positions the center of gravity of the light guide portion 20 on the first member 201 and improves the balance of the light guide portion 20. It is appreciated that this arrangement reduces the backlash between the light guide portion 20 and the base portion 17 without increasing the size of the engagement portion therebetween, and prevents misalignment between the light guide portion and the LED light source 19 while decreasing the weight thereof. The LED light source 19 disposed proximate to the rotation axle 16, resulting in reduction of the weight of the pointer 12. The board 18 is not extended outward of the outer surface of the LCD 2 with respect to the rotation axle 16 such as the conventional pointer, and thus achieves miniaturization of the board 18, resulting in lightweight of the pointer 12.

According to the present invention, the first to the fourth reflection surface M1-M4 improve luminance of the light guide portion 20.

According to the present invention, the first member 201 of the present invention has the forwardly projecting latch projection 201A. The base portion 17 has the bottom wall 173 mounting the first member 201, the pair of the upstanding walls 174 upstanding from the opposite sides of the bottom wall 173 and positioning the first member 201 therebetween, and the first arm 175, which the one end is supported with the pair of the upstanding walls 174 and the another end engages the latch projection 201A. It is apparent that the pair of the upstanding walls 174 reduce the lateral backlash of the light guide portion 20 in the base portion 17. The sliding assembly of the first member 201 into the bottom wall 173 of the base portion 17 to engage between the latch projection 201A of the first member 201 and the first arm 175 of the base portion 17 achieves an easy fixing or assembly of the light guide portion 20 to the base portion 17.

According to the present invention, the pair of the latch projections 178-179 are disposed on the front surface of the base portion 17, and the pair of the latch holes 181-182 are disposed on the board 18. When the board 18 is approached to the base portion 17, the latch projections 178-179 are engaged with the latch holes 181-182 so that the board 18 is easily fixed (assembled) to the base portion 17.

According to the present invention, the FPC 13 is movable inside of the protection member 14 in response to the rotation of the pointer 2. This arrangement prevents the FPC 13 from interfering with the electronic devices disposed outside of the protection member 14.

According to the present invention, the light guide portion 20 of the display apparatus 1 is fixed to the base portion 17 with latching. It is apparent that the present invention is not limited thereto. It is appreciated that the base portion 17 has a press-insertion hole to be press-inserted with the first member 201 of the light guide portion 20. It is also appreciated that the base portion 17 and the first member 201 of the light guide portion 20 can be fixed together with hot welding.

According to the present invention, the board 18 is fixed to the base portion 17 with latching. It is apparent that the present invention is not limited thereto. It is appreciated that the board 18 has a press-insertion hole to be press-inserted with a boss disposed on the base portion 17. It is also appreciated that the base portion 17 and the board 18 can be fixed together with hot welding.

According to the present invention, the display apparatus 1 of the present invention has the latch projections 178-179 disposed on the base portion 17 and the latch holes 181-182 disposed on the board 18. It is apparent that the present invention is not limited thereto. It is appreciated that the base portion 17 may have holes or recesses and the board 18 may have projections for the mutual engagement.

The embodiment of the present invention is only exemplary and not limited thereto. Any modification and alteration is within the scope of the present invention.

What is claimed is:

1. An indicator having a pointer for pointing a scale, the scale being disposed forward of a display device and having a hole at its own center for exposing the display device, the pointer comprising:

a base portion disposed rearward of the display device and fixed to a rotation axle of a motor disposed rearward of the base portion, and extending radially from the rotation axle;

a board fixed on a front face of the base portion;

a light source mounted on the board for radially outwardly emitting a light; and a light guide portion integrally formed with a first member radially outwardly extending and securely mounted on the base portion, an inward end thereof facing the light source, a second member upstanding forwardly from an outward end of the first member, a third member extending radially inwardly from an upper end of the second member, a fourth member upstanding forwardly from an inward end of the third member, and a pointer portion extending radially outwardly from an upper end of the fourth member.

2. The indicator as claimed in claim 1, wherein the first member has a first reflection surface at the outward end thereof, the first reflection surface being inclined radially forwardly for forwardly reflecting the light guided with the first member, the second member has a second reflection surface at the upper end thereof, the second reflection surface being inclined radially rearwardly for radially inwardly reflecting the light guided with the second member, the third member has a third reflection surface at the inward end thereof, the third reflection surface being inclined radially rearwardly for forwardly reflecting the light guided with the third member, and the fourth member has a fourth reflection surface at the upper end thereof, the fourth reflection surface being inclined radially forwardly for radially outwardly reflecting the light guided with the fourth member.

3. The indicator as claimed in claim 1, wherein the first member has a latch projection forwardly projecting, and the base portion includes a bottom wall for mounting the first member, a pair of upstanding walls upstanding from opposite sides of the bottom wall for positioning the first member therebetween, and an arm having one end supported with the pair of the upstanding walls and another end engageable with the latch projection.

4. A display apparatus comprising:

the indicator as claimed in claim 1;

the display device, an outer edge of which is positioned between the first member and the third member; and the scale having the hole at its own center for exposing the display device, an inner edge of which is positioned between the third member and the pointer portion.

5. The indicator as claimed in claim 2, wherein the first member has a latch projection forwardly projecting, and the base portion includes a bottom wall for mounting the first member, a pair of upstanding walls upstanding from opposite sides of the bottom wall for positioning the first member therebetween, and an arm having one end supported with the pair of the upstanding walls and another end engageable with the latch projection.

6. A display apparatus comprising:

the indicator as claimed in claim 2;

the display device, an outer edge of which is positioned between the first member and the third member; and the scale having the hole at its own center for exposing the display device, an inner edge of which is positioned between the third member and the pointer portion.

7. A display apparatus comprising:

the indicator as claimed in claim 3;

the display device, an outer edge of which is positioned between the first member and the third member; and the scale having the hole at its own center for exposing the display device, an inner edge of which is positioned between the third member and the pointer portion.

8. A display apparatus comprising:

the indicator as claimed in claim 5;

the display device, an outer edge of which is positioned between the first member and the third member; and the scale having the hole at its own center for exposing the display device, an inner edge of which is positioned between the third member and the pointer portion.

9. The indicator as claimed in claim 1, wherein the board comprises latch holes, the bottom wall of the base portion comprises latch projections, and the latch holes are engaged with the respective latch projections.

10. The indicator as claimed in claim 1, wherein the board comprises an axle insetion hole, the bottom wall of the base portion comprises an axle portion, and the axle insetion hole accepts the axle portion.

* * * * *